United States Patent [19]

Lesney et al.

[11] Patent Number: 5,196,055

[45] Date of Patent: Mar. 23, 1993

[54] VOC COMPLIANT PRETREATMENT PRIMERS

[75] Inventors: William B. Lesney, Westchester; Frank M. Jachim, Calumet City, both of Ill.

[73] Assignee: The Sherwin-Williams Company, Cleveland, Ohio

[21] Appl. No.: 644,717

[22] Filed: Jan. 23, 1991

[51] Int. Cl.$^5$ ................................ C04B 9/02
[52] U.S. Cl. ................ 106/14.12; 106/419; 148/255; 148/257
[58] Field of Search ............... 106/14.12, 419; 148/255, 257

[56] References Cited

U.S. PATENT DOCUMENTS

| | | | |
|---|---|---|---|
| 3,493,411 | 2/1970 | Clay | 106/419 |
| 3,679,493 | 7/1972 | Belswanger | 106/14.12 |
| 4,324,684 | 4/1982 | Geiger et al. | 106/14.12 |
| 4,626,283 | 12/1986 | Martins et al. | 106/14.24 |

*Primary Examiner*—Shrive Beck
*Assistant Examiner*—Margaret Einsmann
*Attorney, Agent, or Firm*—Steven W. Tan; Robert E. McDonald

[57] ABSTRACT

This invention relates to a two-component, low VOC pretreatment primer comprising:
 a) an aqueous first component comprising
  1) a resin,
  2) a zinc chromate pigment,
  3) a zinc phosphate pigment, and
  4) a package stabilizing agent; and
 b) an aqueous second component comprising a catalyst soution for said first component.

23 Claims, No Drawings

VOC COMPLIANT PRETREATMENT PRIMERS

BACKGROUND OF THE INVENTION

Pretreatment primers which are used in the industrial and automotive industries traditionally are very high in volatile organic content (VOC). Typical VOC levels are upwards of 5.0 lbs/gallon (packaged) and 6.0 lbs/gallon (reduced to sprayable viscosity). Many recent developments in environmental laws and regulations severely limit the VOC content of paint and coating products. For example, the California South Coast Air Quality Management District has proposed VOC restrictions for pretreatment primers of 3.5 lbs/gallon.

In light of the severe VOC restrictions now coming into force, our efforts have focused on developing a low VOC, water reducible pretreatment primer composition which will perform comparably to higher VOC pretreatment primer compositions. This invention relates to a film-forming pretreatment primer for use over clean, untreated metal surfaces having a VOC of less than 3.5 lbs/gallon. The coatings of this invention are particularly useful as pretreatment primers to serve as tiecoats between metal substrates and topcoats in the industrial and automotive industries.

SUMMARY OF THE INVENTION

This invention relates to a two-component pretreatment primer system for application to clean metal surfaces. The pretreatment primer serves as the tiecoat between the substrate and a suitable topcoat. The pretreatment primer of this invention, fully described herein, comprises:
a) an aqueous first component comprising
1) a resin,
2) a zinc chromate pigment,
3) a zinc phosphate pigment, and
4) a package stabilizing agent; and
b) an aqueous second component comprising a catalyst solution for said first component.

Accordingly, it is an object of this invention to teach a low VOC pretreatment primer composition which performs comparably to conventional higher VOC pretreatment primers.

This and other objects will become readily apparent from the detailed description of the invention, below.

DETAILED DESCRIPTION OF THE INVENTION

As stated above, this invention relates to a low VOC pretreatment primer. This primer comprises:
a) an aqueous first component comprising
1) a resin,
2) a zinc chromate pigment,
3) a zinc phosphate pigment, and
4) a package stabilizing agent; and
b) an aqueous second component comprising a catalyst solution for said first component.

The concept behind the compositions of this invention is similar to that of conventional pretreatment primers. The composition, when dissolved in organic solvent and applied over a metal surface will react with the metal surface to form an adherent, complex surface coating that is composed of metal components from the active ingredients in the primer as well as the metal components from the metal surface. These pretreatment primers can advantageously serve as the replacement phosphatizing process at facilities where the size or adaptability of the metal part makes it unattractive to treat the metal via a separate phosphatizing process.

Contrary to conventional, higher VOC pretreatment primers, the compositions of the present invention are aqueous compositions which combine an aqueous resin with a zinc phosphate pigment in the same component. This pigment contributes phosphate ion to the composition, which in combination with the zinc chromate pigment, enables the composition to readily adhere to clean metal surfaces. Contrary to conventional pretreatment primers wherein the phosphate ion source is contributed by a separate catalyst solution, the present invention incorporates the phosphate ion source in the same solution as the film forming resin. In the present invention, the separate catalyst serves predominantly to acid etch the metal.

Suitable resins for use in the first component of this invention include the aqueous latex resins widely known in the paint and coating art. They are typically the result of the emulsion polymerization of acrylic and vinyl monomers and prepolymers. Suitable monomers can be selected from the group consisting of acrylonitrile, methacrylonitrile, acrylic acid, methacrylic acid, itaconic acid, and esters of these acids, especially hydroxy ethyl acrylate and methacrylate, hydroxy propyl acrylate and methacrylate, methyl acrylate and methacrylate, ethyl acrylate and methacrylate, butyl acrylate and methacrylate, lauryl acrylate and methacrylate, and the like, trimethylol propane triacrylate and trimethacrylate, hexanediol diacrylate, acrylamide, methacrylamide, vinyl chloride, vinylidene chloride, styrene, divinyl benzene, vinyl toluene, vinyl naphthalene, multifunctional epoxides, melamines and isocyanates, and mixtures thereof. In addition to pure monomers, preformed polymers and polymeric intermediates can be used.

The resin of this invention can be manufactured according to the well-known processes for producing emulsion polymers, or, the resin can be purchased from readily available sources.

In selecting a resin system for this invention, one need be concerned with preparing or utilizing a resin which air dries by film coalescence, has a Tg sufficiently low enough to provide good film formation under various humidities, generally below about 30 degrees C., exhibits some degree of solvent resistance (to prevent lifting when used with solvent-borne topcoats), and, importantly, exhibits good adhesion over untreated metal surfaces.

One particularly preferred resin system for use in the first component of this invention is commercially available from Rohm and Haas Company under the designation "MV9". MV9 is a latex based upon an acrylonitrile-acrylic copolymer having a Tg of approximately 20 degrees C. MV9 has been found to be capable of undergoing crosslinking with the zinc chromate pigment of this invention provided there is a water soluble source of phosphate ions in the composition to impart acidity to the solution. This phosphate ion source is contributed by the zinc phosphate pigment present in the solution.

In addition to the resin, the first component must further comprise a pigment which is capable of complexing with the metal substrate. In the present invention, a combination of two separate pigments is used. The first pigment comprises a zinc chromate pigment. Preferably, this first pigment comprises finely divided discrete particles of a zinc tetraoxychromate pigment. A particularly suitable zinc tetraoxychromate pigment is commercially available from Mineral Pigments Corporation. The second pigment comprises a zinc phosphate pigment. Preferably, this second pigment comprises a zinc silica phosphate hydrate comprising zinc, $BaSO_4$, $SiO_2$, $MgO$ and $PO_4$. A particularly suitable zinc phosphate pigment is commercially available from Heubach under the tradename Heucophos ZBZ (tm). The combined pigmentation used herein produces an anodic mechanism which complexes with other metal cations on the substrate surface to provide adhesion of the coating to the substrate. In order to function properly, the pigmentation used herein must be slightly water soluble for proper ionization. This water solubility, however, can adversely impact package stability; and therefore, the level of pigmentation is critical. The pigmentation level in the first component for the zinc chromate pigment is generally less than or equal to about 4.5% PVC, preferably about 3% PVC. The pigmentation level in the first component for the zinc phosphate pigment is generally less than or equal to about 6% PVC, preferably about 3.5% PVC.

In addition to the above pigments, one or more inert pigments can optionally be included in the first component of the composition. Preferably, one such pigment is a relatively low level of micronized talc, up to about 4% PVC, preferably up to about 2% PVC. Micronized talc can favorably impact the composition's resistance to transmission of moisture through the film and improve the dry time of the coating.

In addition to the above, the first component of this invention further preferably comprises an adhesion promoting ingredient. The preferred adhesion promoting ingredient comprises a stabilized casein solution. Casein is a well known phosphoprotein composition. It is sparingly soluble in water and nonpolar organic solvents, but is soluble and will form salts in alkali solutions. The use of a casein solution in the first component of this invention improves adhesion of the coating to the substrate, improves the pigment wetting, and thus helps to improve package stability. One particularly preferred casein solution is commercially available from Ultra Additives under the tradename Ulasein 15 (tm). Such solutions can be added to the first component of this invention in an amount up to about 5% by weight, preferably up to about 1% by weight.

The first component of this invention must further comprise a dispersing agent for package stability. Preferred package stability agents include the sodium salts of carboxylated polyelectrolytes. Such agents are known to impart stability to latex systems and are useful herein. One particularly preferred stabilizing agent is Tamol 850 (tm) commercially available from Rohm and Haas Company. It can be added in an amount from about 0.1% (based upon total pigment weight) to about 4.0% (based upon total pigment weight), preferably in an amount of between about 2.0% and 3.0% (based upon total pigment weight).

In addition to the above stability agent, the first component of this invention generally further comprises a thickening agent. One particularly preferred thickening agent is the alkali swellable acrylic polymer emulsion commercially available from Rohm and Haas Company under the tradename Acrysol TT-615 (tm). If used, it is preferably contained in the pigment dispersion and thus added to the first component during the grind phase. However, it can be added to the first component during the letdown phase provided that care is taken to avoid destabilizing the composition. When used, suitable amounts of thickening agents can range from between about 2.0% by weight (based upon polymer solids) to about 10.0% by weight (based upon polymer solids).

The first component also generally further comprises coalescing solvents selected from the group consisting of water miscible glycol ethers such as butyl cellosolve and butyl carbitol. The amount of butyl cellosolve (weight % butyl cellosolve to polymer solids) is generally between about 35% and about 60%, preferably about 45%. The amount of butyl carbitol (weight % butyl carbitol to polymer solids) is generally between about 10% and about 20%, preferably about 15%. The butyl cellosolve is incorporated to provide shorter tack free dry times to the coating composition whereas the butyl carbitol is incorporated to upgrade the coatings film formation and adhesion characteristics.

Ethylene glycol can additionally be added to the first component to fine tune the application characteristics of the coating and to aid in the milling of the composition.

The second component of this invention comprises an aqueous catalyst solution for said first component. It comprises an aqueous solution of a naturally occurring organic acid, preferably tannic acid, and tetrachlorophthalic anhydride adjusted to a pH of about 11. Generally, ammonia is used to adjust pH. A preferred catalyst solution comprises between about 0.4% and about 3.0% by weight of tannic acid, between about 0.1% and about 1.0% by weight of tetrachlorophthalic anhydride, in water.

What is claimed is:

1. A two-component pre-treatment primer system for application to cleanmetal surfaces comprising:
   (a) an aqueous first component comprising:
      (1) a resin comprising the emulsion polymerization product of one or more monomers selected from the group consisting of acrylic and vinyl monomers and prepolymers, multifunctional epoxides, melamines and isocyanates,
      (2) a zinc chromate pigment present in an amount less than about 4.5% PVC,
      (3) a zinc phosphate pigment present in an amount less than about 6% PVC, and
      (4) a package stabilizing agent comprising an agent selected from the group consisting of sodium salts of carboxylated polyelectrolytes; and
   (b) an aqueous second component comprising a catalyst for said first component, wherein said second component comprises a blend of a naturally occurring organic acid and an anhydride in water.

2. The system of claim 1 wherein said monomers are selected from the group consisting of acrylonitrile, methacrylonitrile, acrylic acid, methacrylic acid, itaconic acid, and esters of these acids, acrylamide, methacrylamide, vinyl chloride, vinylidene chloride, styrene, divinyl benzene, vinyl toluene, vinyl naphthalene, multifunctional epoxides, melamines and isocyanates, preformed polymers and polymeric intermediates of these monomers, and mixtures thereof.

3. The system of claim 2 said resin comprises an acrylonitrile-acrylic copolymer having a Tg of approximately 20 degrees C.

4. The system of claim 3 wherein said zinc chromate pigment comprises zinc tetraoxychromate and wherein said zinc phosphate pigment comprises a zinc silica phosphate hydrate.

5. The system of claim 4 wherein said package stabilizing agent is present in an amount from about 0.1% to about 4.0% based upon total pigment weight.

6. The system of claim 5 wherein said package stabilizing agent is present in an amount from about 2.0% to about 3.0% based upon total pigment weight.

7. The system of claim 6 wherein said second component comprises a blend of between about 0.4% and about 3.0% by weight of tannic acid and between about 0.1% and about 1.0% by weight of tetrachlorophthalic anhydride, in water adjusted to a pH of about 11.

8. The system of claim 7 wherein the first component further comprises at least one coalescing solvent selected from the group consisting of glycol ether solvents.

9. The system of claim 8 wherein the coalescing solvent comprises ethylene glycol monobutyl ether and diethylene glycol monobutyl ether, and wherein the amount of ethylene glycol monobutyl ether is between about 35% and about 60% of the weight of the polymer solids and the amount of diethylene glycol monobutyl ether is between about 10% and about 20% of the weight of the polymer solids.

10. The system of claim 9 wherein the amount of ethylene glycol monobutyl ether is about 45% of the weight of the polymer solids and the amount of is about 15% of the weight of the polymer solids.

11. The system of claim 10 further comprising a stabilized casein adhesion promoting ingredient.

12. The system of claim 11 wherein said adhesion promoting ingredient is present in an amount up to about 1% by weight.

13. The system of claim 1 wherein said zinc chromate pigment comprises zinc tetraoxychromate and wherein said zinc phosphate pigment comprises a zinc silica phosphate hydrate.

14. The system of claim 13 wherein said package stabilizing agent is present in an amount from about 0.1% to about 4.0% based upon total pigment weight.

15. The system of claim 14 wherein said package stabilizing agent is present in an amount from about 2.0% to about 3.0% based upon total pigment weight.

16. The system of claim 15 wherein said second component comprises a blend of a naturally occurring organic acid and tetrachlorophthalic anhydride in water adjusted a pH of about 11.

17. The system of claim 16 wherein said second component comprises a blend of between about 0.4% and about 3.0% by weight of tannic acid and between about 0.1% and about 1.0% by weight of tetrachlorophthalic anhydride, in water adjusted to a pH of about 11.

18. The system of claim 17 further comprising at least one coalescing solvent selected from the group consisting of glycol ether solvents.

19. The system of claim 18 wherein the coalescing solvent comprises ethylene glycol monobutyl ether and diethylene glycol monobutyl ether, and wherein the amount of ethylene glycol monobutyl ether is between about 35% and about 60% of the weight of the polymer solids and the amount of diethylene glycol monobutyl ether is between about 10% and about 20% of the weight of the polymer solids.

20. The system of claim 19 wherein the amount of ethylene glycol monobutyl ether is about 45% of the weight of the polymer solids and the amount of is about 15% of the weight of the polymer solids.

21. The system of claim 20 further comprising a stabilized casein adhesion promoting ingredient.

22. The system of claim 21 wherein said adhesion promoting ingredient is present in an amount up to about 1% by weight.

23. The system of claim 2 wherein said acid esters are selected from the group consisting of hydroxy ethyl acrylate and methacrylate, hydroxy propyl acrylate and methacrylate, methyl acrylate and methacrylate, trimethylol propane triacrylate and trimethacrylate and hexanediol diacrylate.

* * * * *